(12) United States Patent
Okubo et al.

(10) Patent No.: US 6,857,960 B2
(45) Date of Patent: Feb. 22, 2005

(54) VIDEO GAME DEVICE, BACKGROUND SOUND OUTPUT METHOD IN VIDEO GAME, AND READABLE STORAGE MEDIUM STORING BACKGROUND SOUND OUTPUT PROGRAM

(75) Inventors: Satoru Okubo, Osaka (JP); Shigeru Araki, Takatsuki (JP)

(73) Assignee: Konami Corporation, Tokyo (JP)

( * ) Notice: Subject to any disclaimer, the term of this patent is extended or adjusted under 35 U.S.C. 154(b) by 469 days.

(21) Appl. No.: 09/779,412

(22) Filed: Feb. 8, 2001

(65) Prior Publication Data

US 2001/0014621 A1 Aug. 16, 2001

(30) Foreign Application Priority Data

Feb. 14, 2000 (JP) ........................................ 2000-035577

(51) Int. Cl.[7] .................................................. A63F 9/24
(52) U.S. Cl. ............................... 463/35; 463/7; 381/61
(58) Field of Search ..................... 463/1, 4–8, 25–36, 463/40–43; 455/3.06; 704/259, 270; 381/61–63

(56) References Cited

FOREIGN PATENT DOCUMENTS

| EP | 0769751 | 4/1997 |
|---|---|---|
| EP | 0789308 | 8/1997 |
| JP | 06-149275 | 5/1994 |
| JP | 07-163754 | 6/1995 |
| JP | 07-222867 | 8/1995 |
| JP | 07222867 | 8/1995 |
| JP | 08-215433 | 8/1996 |
| JP | 08-243254 | 9/1996 |
| JP | 10165645 | 6/1998 |
| JP | 11249694 | 9/1999 |
| JP | 11-327569 | 11/1999 |
| JP | 2000-267675 | 9/2000 |

OTHER PUBLICATIONS

JPO website translation of JP 07–163754.*
JPO website translation of JP 07–222867.*
JPO website translation of JP 08–215433.*
JPO webstire translation of JP 08–243254.*

* cited by examiner

Primary Examiner—Mark Sager
(74) Attorney, Agent, or Firm—Jordan and Hamburg LLP (57) ABSTRACT

A video game device comprises: a monitor; a display unit for displaying an event place where a specific event is performed on the monitor; a sound output unit for outputting a background sound relating to the event; a memory for storing a background sound data relating to the event; an event place determining unit for determining types of event places; and a background sound controller for reading out the background sound data from the memory, outputting it as a background sound and performing an echo process on the background sound in response to the type of the event place determined by the event place determining unit.

20 Claims, 6 Drawing Sheets

VIDEO GAME DEVICE, BACKGROUND SOUND OUTPUT METHOD IN VIDEO GAME, AND READABLE STORAGE MEDIUM STORING BACKGROUND SOUND OUTPUT PROGRAM

The present invention relates to a video game device using an optical disk, a magnetic disk or, for example, a cassette-type storage medium including a semiconductor memory or the like in which program data are stored, a background sound output method in a video game and a readable storage medium storing a background sound output program.

BACKGROUND OF THE INVENTION AND RELATED ART STATEMENT

A huge number of video game systems have been proposed. These systems include, for example, systems comprised of a special device for home use and a television monitor and systems comprised of a special device for business use, a personal computer or a workstation, a display and a sound output device. Any one of these systems includes a controller used by a game player for operation, a storage medium storing game program data, a CPU for executing controls to generate images and sounds based on the game program data, a processor for generating images, a processor for generating sounds, a CRT or like monitor for displaying images, and a loudspeaker for outputting sounds. CD-ROMs, semiconductor memories, cassette-type storage mediums having a built-in semiconductor memory are frequently used as the above storage medium.

In such video game systems, various competition games such as soccer and baseball games and various running races such as short-distance races and long-distance races which are played outdoors, and gymnastic completions such as the vaulting horse and the horizontal bar and various other competitions made indoors can be executed in the game space. In event places such as stadiums and gymnasiums where competitions are actually made, announcements are suitably given concerning contents of competitions while the competitions proceed. Thus, if announcing sounds are outputted as background sounds in the video game system as well, enthusiasm can be put into game contents and a better feeling of being present at the competition can be given. Further, actual announcing sounds at the event place are frequently accompanied by echoes (echoing sounds). Therefore, an even better feeling of presence can be given by applying echoing to the announcing sounds if necessary.

If the event place differs, actual echoes differ in delay and volume because surrounding echoing conditions differ. However, in the case that the announcing sounds include echoes in the video game, they only contain the same echoes having specified delay and volume even if the event place differs. Accordingly, if a plurality of game programs are stored in a cassette-type storage medium and the event place differs from game to game or events are held in a plurality of event places even in the same game, the feeling of presence may lack if the delay and volume of the echoes are same at the respective places of event.

Such a problem may be solved by separately storing background sound data including echoes corresponding to event places. This, however, necessitates a large-capacity memory and a time longer than necessary for the development of programs, thereby presenting another problem of becoming a large factor of increased production costs for the game system.

In view of the above situation, an object of the present invention is to provide a video game device which can execute a game having a better feeling of presence and effectively suppress an increase in production costs, a background sound output method in a video game and a readable storage medium storing a background sound output program.

SUMMARY OF THE INVENTION

In order to fulfill the above object, a video game device, according to the present invention, comprises: a monitor; a display unit for displaying an event place where a specific event is performed on the monitor; a sound output unit for outputting a background sound relating to the event; a memory for storing a background sound data releting to the event; an event place determining unit for determining types of event places; and a background sound controller for reading out the background sound data from the memory, outputting it as a background sound and performing an echo process on the background sound in response to the type of the event place determined by the event place determining unit.

These and other objects, features and advantages of the present invention will become more apparent upon a reading of the following detailed description and accompanying drawings.

DETAILED DESCRIPTION OF THE PREFERRED EMBODIMENTS OF THE INVENTION

Figure 1:
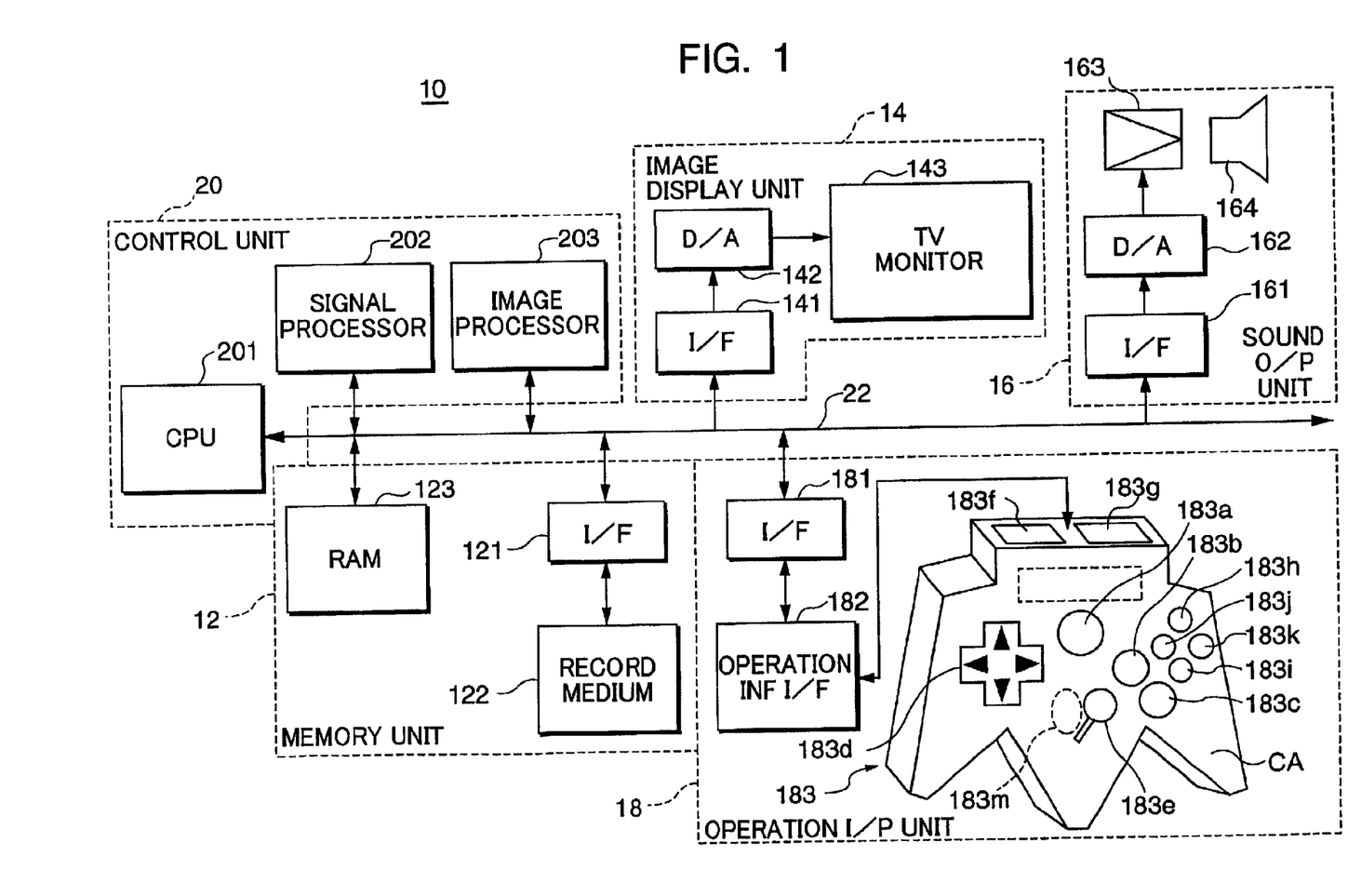
FIG. 1 is a construction diagram showing a video game system to which a background sound output method according to one embodiment of the invention is applied.

FIG. 1 is a diagram showing the schematic construction of a video game system (video game device) 10 to which a background sound output method according to one embodiment of the present invention is applied. In FIG. 1, the video game system 10 is provided with a memory unit 12, an image display unit 14, a sound output unit 16, an operation input unit 18 and a control unit 20. The units 12, 14, 16 and 18 are connected with each other via a bus 22 including address buses, data buses and control buses connected with a CPU 201 of the control unit 20 to be described later.

In the memory unit 12 are stored game data comprised of image data, sound data and program data. The memory unit 12 includes a storage medium 122 connected with the bus 22 via an interface circuit 121 and a RAM 123 for temporarily storing the game data read from the storage medium 122. The storage medium 122 is, for example, a so-called ROM cassette in which a ROM or like storage medium storing game data and program data of an operating system is accommodated in a plastic casing, an optical disk, or a flexible disk. Instead of the RAM 123, an EEPROM or other memory for temporarily saving the game data may be used.

The image display unit 14 is adapted to display various game images in accordance with the progress of the game and includes a digital-to-analog (D/A) converter 142 connected with the bus 22 via an interface circuit 141 and a television monitor (video monitor) 143 including a CRT, a liquid crystal display or the like connected with the D/A converter 142.

The sound output unit 16 outputs a game music, sound effects or various background sounds such as cheers, announcing sounds and the like for putting enthusiasm into the game content based on the sound data stored in the storage medium 122 or data storage areas of the RAM 123 of the memory unit 12 as the game proceeds. The sound output unit 16 is provided with a D/A converter 162 connected with the bus 22 via an interface circuit 161, an amplifying circuit 163 connected with the D/A converter 162 and a loudspeaker 164 as a sound output unit for outputting the background sounds in accordance with an output signal of the amplifying circuit 163. In this embodiment, out of sound data, those used to output cheers and announcing sounds are referred to as background sound data and, among the background sound data, those used to output the announcing sounds are referred to as announcement data.

The operation input unit 18 is adapted to output operation signals to the control unit 20 and is provided with an operational information interface circuit 182 connected with a bus 22 via an interface circuit 181, and a controller 183 connected with the operational information interface circuit 182. The controller 183 includes a start button 183a, an A-button 183b, a B-button 183c, a cross-shaped key 183d, a stick-shaped controller 183e, a C1-button 183h, a C2-button 183i, a C3-button 183j and a C4-button 183k provided on the front surface of a casing CA, a left trigger button 183f and a right trigger button 183g provided on the upper surface of the casing CA, and a Z-button 183m provided on the rear surface of the casing CA.

The stick-shaped controller 183e has substantially the same construction as a joystick. Specifically, the controller 183e has a standing stick (operation bar), which can be inclined to front, back, left, right or in any direction in a 360° range about a specified point of the stick as a supporting point. According to the direction and angle of inclination of the stick, an X-coordinate along transverse direction and a Y-direction along forward/backward direction in coordinate systems having the standing position of the stick as an origin are sent to the control unit 20 via the interface circuits 182 and 182.

The control unit 20 is adapted to control the progress of the game, and is comprised of the CPU 201 connected with the bus 22, a signal processor 202 and an image processor 203. The signal processor 202 mainly performs calculation of image data in a three-dimensional (3D) space, calculation for transforming a position in the 3D space to a position in a simulated 3D space, a light source calculation, and generation and processing of sound data. The image processor 203 writes an image data to be displayed in the RAM 123 based on the calculation results in the signal processor 202. For example, the image processor 202 writes a texture data in an area of the RAM 123 specified by a polygon.

The video game system 10 thus constructed takes different modes according to its application. Specifically, in the case that the video game system 10 is constructed for business use, all the elements shown in FIG. 1 are, for example, contained in one casing. In the case that the video game system 10 is constructed for home use, the television monitor 143, the amplifying circuit 163 and the loudspeaker 164 are separate from a main game unit.

Here, the main game unit is, for example, comprised of the interface circuit 121 connected with the CPU 201, the RAM 123, the interface circuit 141, the D/A converter 142, the interface circuit 161, the D/A converter 162, the interface circuit 181, the operational information interface circuit 182, the controller 183, the signal processor 202 and the image processor 203. This main game unit is constructed by accommodating the respective elements in a casing made of a synthetic resin, and the storage medium 122 is detachably mounted in a mounting portion formed in this casing. The controller 183 is connected with a connector provided in the casing via a communication cable or the like.

In the case that the video game system 10 is constructed with a personal computer or a workstation as a core, for example, the television monitor 143 corresponds to a computer display, the image processor 203 corresponds to part of the game program data stored in the storage medium 122 or hardware on an extension board mounted on an extension slot of the computer, and the interface circuits 121, 141, 161, 181, the D/A converters 142, 162, and the operational information interface circuit 182 correspond to hardware on the extension board mounted on the extension slot of the computer. Further, the RAM 123 corresponds to the main memory of the computer or the respective areas of an extension memory.

A case where the video game system 10 is constructed for home use is described below. First, when the video game system 10 is activated, the CPU 201 reads image data, sound data and game program data from the respective specified storage areas of the storage medium 122 in accordance with the operating system stored in the storage medium 122, and all or part of the read image data, sound data and game program data are stored in the RAM 123. Thereafter, a specified game is proceeded by the CPU 201 in accordance with the game program data stored in the RAM 123 and contents of instructions given by a game player via the controller 183.

Specifically, commands as tasks for forming images and outputting sounds are generated in accordance with contents of instructions given by the game player via the controller 183. The signal processor 202 performs calculation of display positions of characters in the 3D space (of course the same applies for a two-dimensional space), a light source calculation, generation and processing of sound data, etc. in accordance with these commands.

Data of images to be formed are written in the RAM 123 by the image processor 203 based on the calculation results. The image data written in the RAM 123 are fed to the D/A converter 142 via the interface circuit 141, and fed to the television monitor 143 after being converted into analog video signals in the D/A converter 142, thereby being displayed as game images on a display surface of the television monitor 143.

On the other hand, the sound data outputted from the signal processor 202 are fed via the interface circuit 161 to the D/A converter 162 and outputted as background sounds from the loudspeaker 164 in a specified volumn after being converted into an analog sound signal in the D/A converter 162 and amplified in the amplifying circuit 163.

Next, contents of the game executed in the video game system 10 are summarily described based on the game program stored in the storage medium 122. In this video game system 10, a plurality of competition game programs are stored in the storage medium 122, and one competition game can be selected therefrom by operating the start button 183*a*. Here, various competition games including a 100 M-dash game as shown in FIG. 2, a long jump game as shown in FIG. 3 and a vaulting horse game as shown in FIG. 4 can, for example, be executed.

Figure 2:
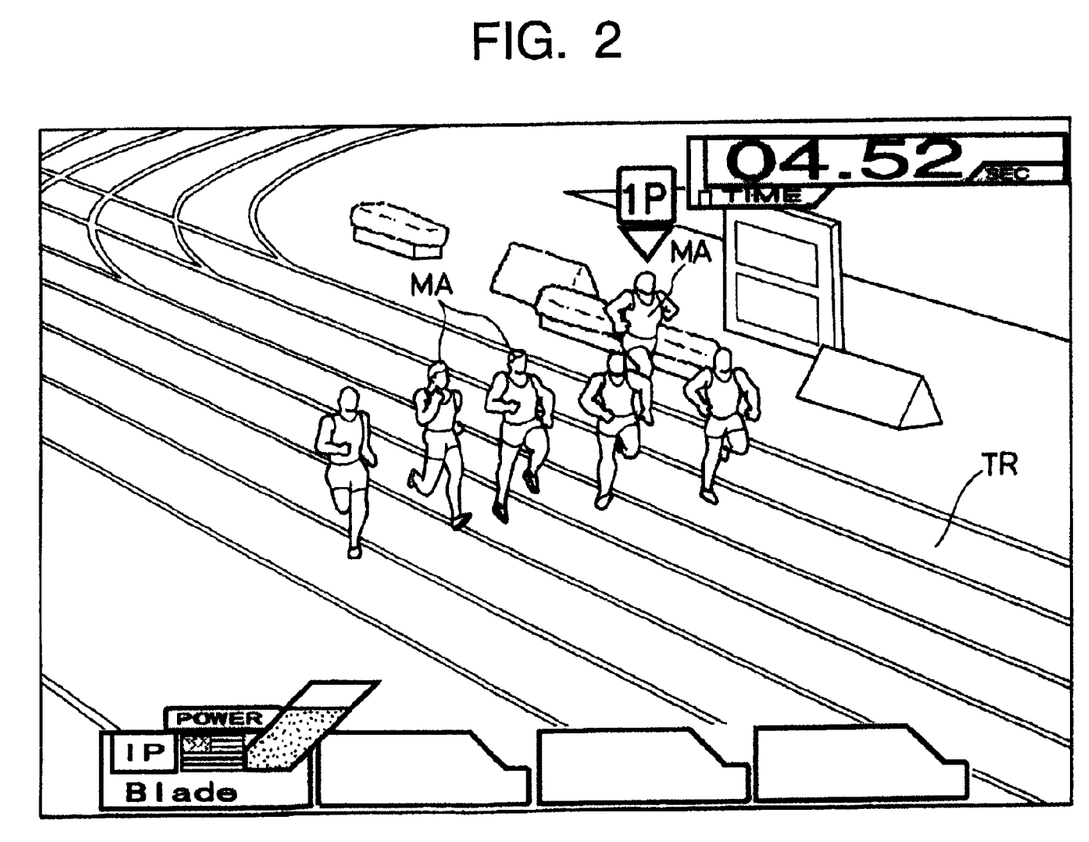
FIG. 2 is a diagram showing one scene of a game executed in the video game system shown in FIG. 1.

In the 100 M dash game shown in FIG. 2 is held at an outdoor athletic field (event place) in the game space. In this embodiment, the game is played by one to four game players, the running speeds of play characters MA corresponding to the respective game players out of six play characters MA running on track TR are controlled through operation of the controller 183 by the game players, and the running motions of the remaining play characters MA are controlled based on data set in advance. Ranking is determined based on an order of arrival at a goal.

In this 100 M dash game, a cheer is given from the spectators when the game is started. Simultaneously, an announcing sound "Ladies and Gentlemen! We will now begin Men's 100 M dash" are given with echoes to announce the start of the 100 M dash. FIG. 2 shows a state where the six play characters MA are spurting toward the goal line.

Figure 3:
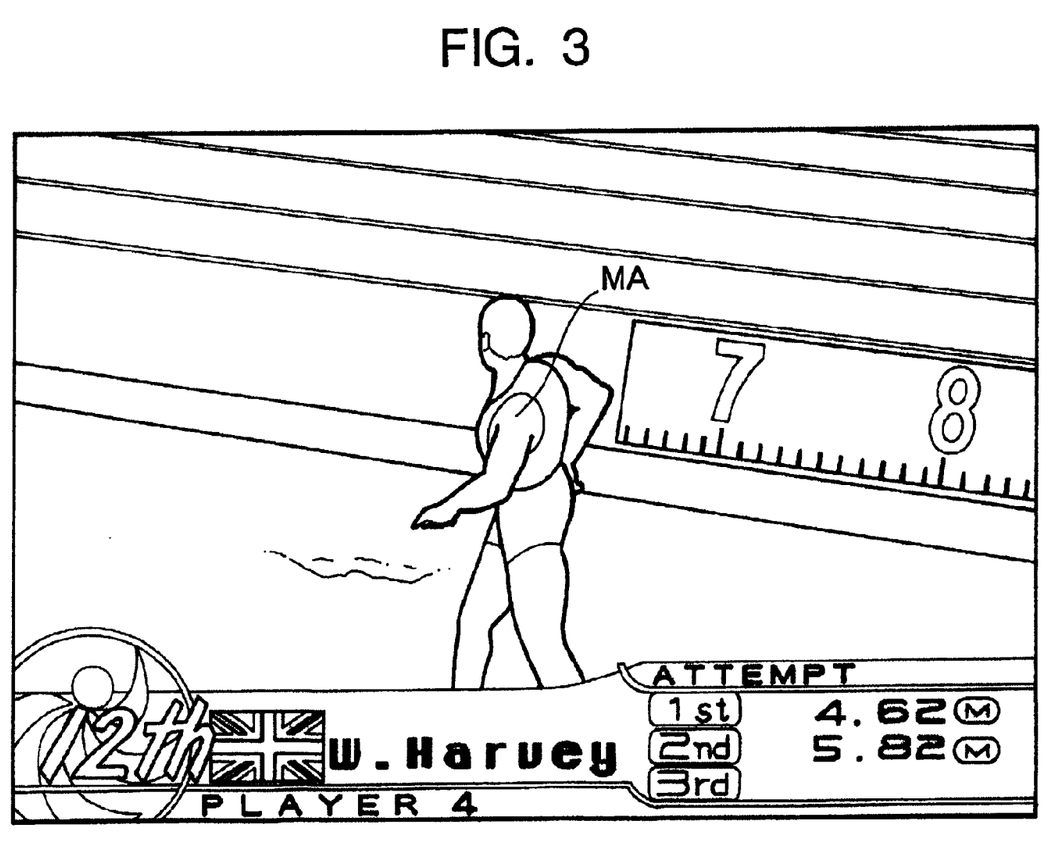
FIG. 3 is a diagram showing one scene of another game executed in the video game system shown in FIG. 1.
Figure 4:
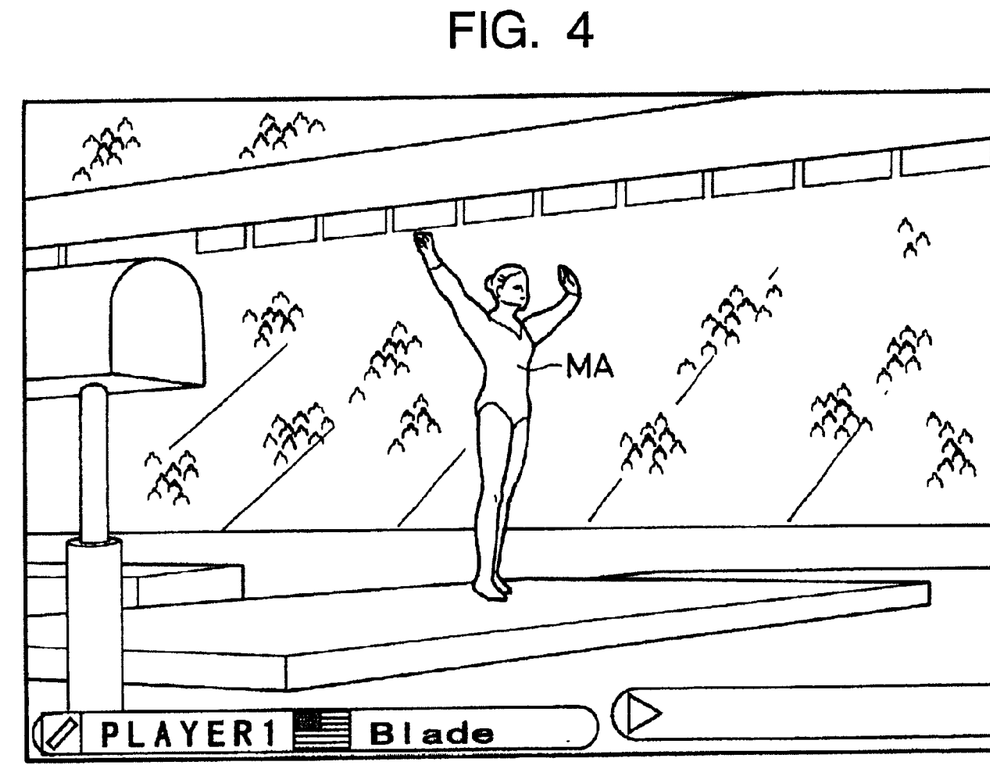
FIG. 4 is a diagram showing one scene of still another game executed in the video game system shown in FIG. 1.

The long jump game shown in FIG. 3 is held at an outdoor athletic field (event place) in the game space, jumped distances are competed by kicking the ground at a specified position to jump after an approach run. In this embodiment, this game is played by one to four game players, play characters MA corresponding to the game players successively appear, and ranking is determined based on maximum jumped distances obtained as a result of three jumps made by the respective play characters MA.

Similar to the case of the 100 M dash game, a cheer is also given from the spectators in this game when the game is started. Simultaneously, announcing sounds "Ladies and Gentlemen! We will now begin . . . " are given with echoes to announce the start of the long jump competition. FIG. 3 shows a state where the play character MA is returning to a starting position of the approach run for the third jump after finishing the second jump. The echoes of the announcing sounds given at this long jump competition are the same as in the case of the 100 M dash since this competition is held at the same event place as the 100 M dash.

The vaulting horse game shown in FIG. 4 is held in an indoor gymnasium (event place) in the game space, and contents of performance are contended by jumping into the air via a vaulting horse after an approach run, giving a performance such as turning, and landing. In this embodiment, the game is played by one to four game players, play characters MA corresponding to the game players successively appear, and ranking is determined based on average points of evaluation points given to three performances made by each play character MA.

Similar to the case of the 100 M dash game and the long jump game, a cheer is also given from the spectators in this game when the game is started. Simultaneously, announcing sounds "Ladies and Gentlemen! We will now begin . . . " are given with echoes to announce the start of the vaulting horse competition. FIG. 4 shows a state where the play character MA turns to judges after completing the landing. The echoes of the announcing sounds at the vaulting horse competition have a shorter delay from the direct sounds and are damped to a lesser degree as compared to the case of the outdoor athletic field since the competition is held in the gymnasium and walls for reflecting the sounds are located near. In any of the above games, the announcing sounds are outputted not only at the start of the game, but announcements of suitable contentes are also given, if necessary, during the game and at the end of the game.

Figure 5:
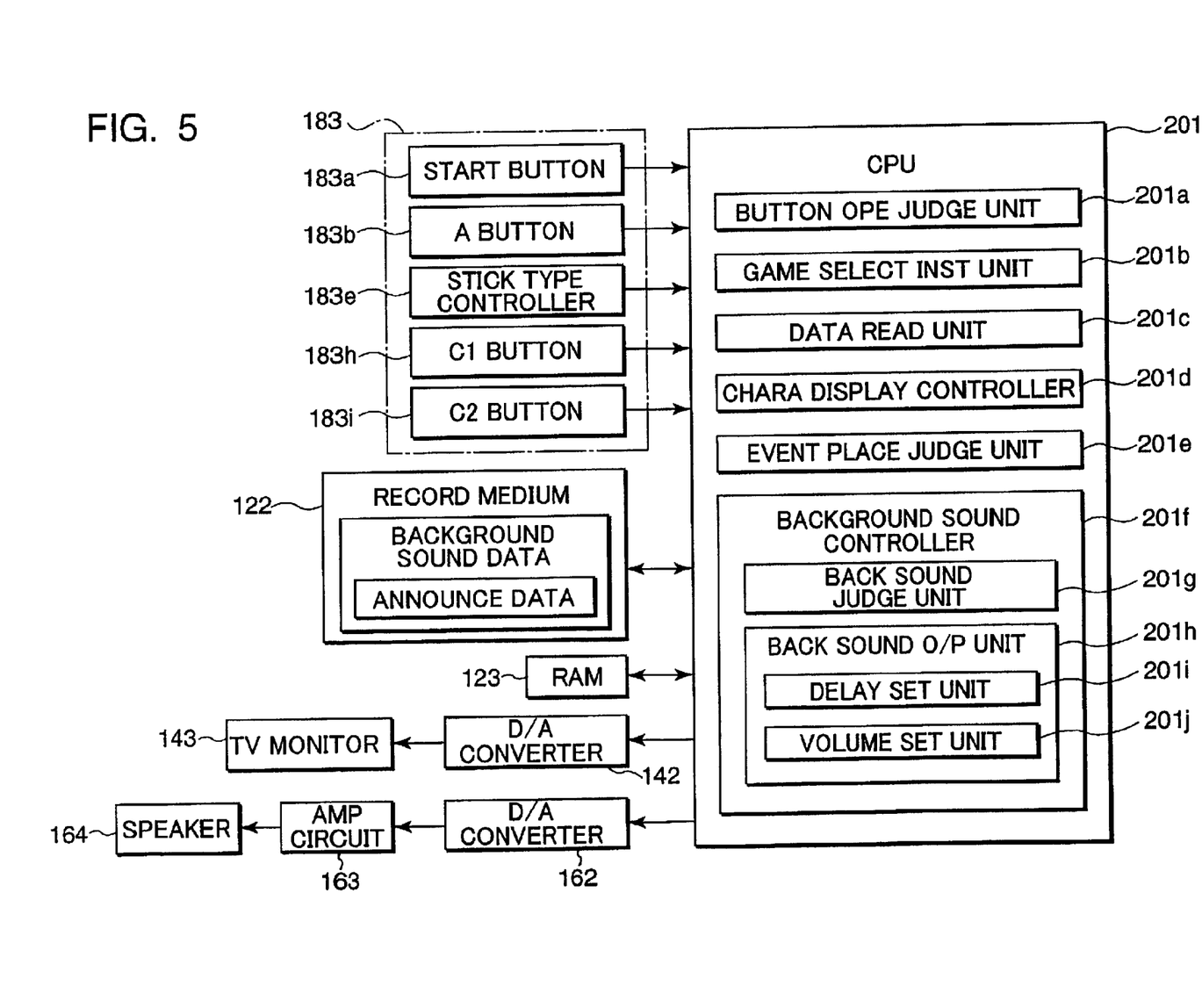
FIG. 5 is a block diagram showing function realizing unit of a CPU in the video game system shown in FIG. 1.

FIG. 5 is a block diagram showing function realizing unit of the CPU 201 centering on the output of the announcing sounds, the storage medium 122, the RAM 123, the television monitor 143 and the controller 183 (start-button 183*a*, A-button 183*b*, stick-shaped controller 183*e*, C1-button 183*h* and C2-button 183*i*). The interface circuits, buses, etc. are not shown in FIG. 4 in order to simplify the description.

Specifically, the CPU 201 is provided with the respective function realizing unit as a button operation determining unit 201*a*, a game selection instructing unit 201*b*, a data reading unit 201*c*, a character display controller 201*d*, an event place determining unit 201*e* and a background sound controller 201*f*. The background sound controller 201*f* is provided with the respective function realizing unit as a background sound determining unit 201*g* and a background sound output unit 201*h*. The background sound output unit 201*h* is provided with the respective function realizing unit as a delay setting unit 201*i* and a volume setting unit 201*j*.

The button operation determining unit 201*a* determines whether the start button 183*a*, A-button 183*b*, the stick-shaped controller 183*e*, C1-button 183*h* and C2-button 183*i* have been turned on or off in accordance with operation signals from these buttons and controller. One game is selected from a plurality of games when the start button 183*a* is turned on. The start of the game is enabled when the A-button 183*b* is operated. Further, when the stick-shaped controller 183*e* is operated, the level of the technique performed by the play character MA is determined according to the operated amount of the stick-shaped controller 183*e* in the case of the vaulting horse game. When the C1-button 183*h* and the C2-button 183*i* are alternately successively operated, the running speed of the play character MA is increased in the case of the 100 M dash game and the jumped distance is increased in the case of the long jump game.

The game selection instructing unit 201*b* gives, to the data reading unit 201*c*, an intruction to read the program of the selected game from the storage medium 122 when one game is selected from a plurality of games by operating the start button 183*a*. The data reading unit 201*c* reads the game data (game program) from the storage medium 122 based on the reading instruction from the game selection instructing unit 201*b*, stores the read game data in the RAM 123, and read the game data from the RAM 123 as the game proceeds. The game selection instructing unit 201*b* constructs the game selecting unit together with the start button 183*a* and the button operation determining unit 201*a*.

The character display controller 201*d* controls the display of the game screens including the play characters MA and background images as the selected game proceeds, and is adapted to output the image data read from the RAM 123 by the data reading unit 201*c* to the image display unit 14 and to display the game screens on the television monitor 143.

The event place determining unit 201*e* determines the type of the event place (athletic field, gymnasium, etc.) where an event such as a competition is being executed in the game space. This judgement is made based on the delay (echoing time) of the echoe (echoing sound) from the direct sound and its volumn. Specifically, the delay of the echo is longer at the outdoor event place than in the indoor event place since high-rise buildings, mountains or the like which become reflection walls for reflecting the announcing sounds are present far away from the event place, whereas the damping factor of the sounds is larger at the outdoor event place than in the indoor event place. Further, since the reflection walls for reflecting the announcing sounds are present near in the indoor event place, the delay is shorter than at the outdoor event place, whereas the damping factor of the sounds is smaller than at the outdoor event place. Even among indoor event places, the delay and the volume vary depending on the size of the event place.

By changing the delay and volume of the echoes according to the type of the event place in the game space, a feeling of presence similar to the one which could be obtained at the event place where a competition or the like is actually held can be provided. In this embodiment, a specific cheer is simultaneously outputted when the announcing sounds are outputted. The type of the event place is determined by determining a cheer data for outputting the cheer (i.e. by determining the name of a label affixed to the cheer data).

The background sound controller 201f controls the output of a game music, sound effects, various background sounds including cheers and announcing sounds as the game proceeds. The background sound controller 201f successively reads the sound data from the RAM 123, outputs them to the sound output unit 16, and outputs them as background sounds via the loudspeaker 164. In the case that the background sounds to be outputted are announcing sounds, this controller 201f applies echoing to the announcing sounds to output them with echoes via the loudspeaker 164.

The background sound determining unit 201g determines whether the background sounds to be outputted via the loudspeaker 164 should include echoes (i.e. whether echoing needs to be applied thereto). Since, among various background sounds, only the announcing sounds include echoes in this embodiment, whether or not the background sounds are announcing sounds is determined. This judgement is made, for example, based on the name of a label affixed to a sound output command when this sound output command is read from the game program.

The background sound output unit 201h outputs the announcing sounds with echoes by applying echoing to the announcing sounds. The delay setting unit 201i sets the delay of the echoes according to the type of the event place, whereas the volume setting unit 201j sets the volume of the echoes according to the type of the event place. Taking the above 100 M dash game as an example, in order to output the announcing sounds "Ladies and Gentlemen! We will now begin Men's 100 Meter Dash" with echoes, an announcement data of a content "Ladies and Gentlemen! We will now begin Men's 100 Meter Dash" is read from the RAM 123, inputted to the sound output unit 16 and outputted as announcing sounds via the loudspeaker 164.

The sound data of the content "Ladies and Gentlemen! We will now begin Men's 100 Meter Dash" is repeatedly read after the delay set for the event place, inputted to the sound output unit 16, and outputted as announcing sounds in the volume set for the event place via the loudspeaker 164. In this way, echoing is applied to generate echoes having specified delay and volume. For example, the delay and the volume are respectively set at 1000 msec. and 200/255 for an event place A; at 500 msec. and 160/255 for an event place B; and at 180 msec. and 190/255 for an event place C. These delays and volumes are included in the game data as delay data and volume data for each event place, and echoing is applied to the announcing sounds based on these data.

The announcing sounds outputted at the start of the game is exemplarily described here. The announcing sounds are stored in specified data storage areas of the storage medium while being divided into four unit announcement data of "Ladies and Gentlemen", "We will now", "begin" and "names of various competitions (e.g. Men's 100 Meter Dash)". By successively reading the four unit announcement data stored in the RAM 123 when the sound output command is given, these data can be outputted via the loudspeaker 164 as a series of contents of announcement.

Accordingly, if the content of announcement outputted at the start of the game is exemplarily described, an announcement data representing one content of announcement is constructed by the first three unit announcement data and the last unit announcement data expressing the name of the competition to be selected for the game to be executed. The announcing sounds can be outputted with echoes by repeatedly reading this announcement data after a specified delay and setting smaller volume for the announcing sound represented by the announcement data read later. The announcing sounds to be outputted during the game and at the end of the game are also stored while being divided into a plurality of unit announcement data according to the content of announcement, and are outputted by reading these unit announcement data in combination suitable for the game content.

Figure 6:
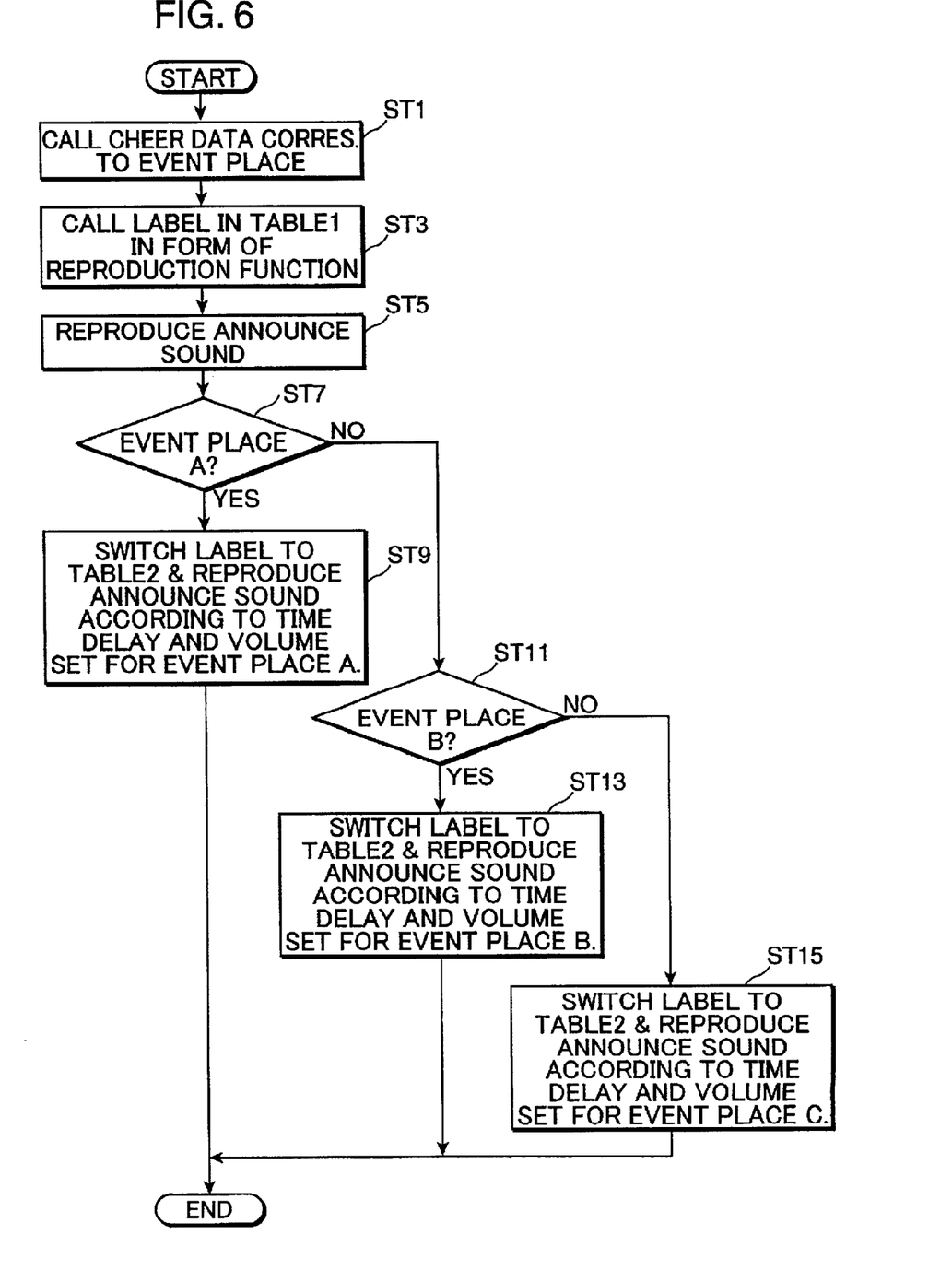
FIG. 6 is a flow chart showing the operation of the video game system shown in FIG. 1.

Next, the output of the announcing sounds in the video game system 10 in the case that the 100 M dash game is selected is described with reference to a flow chart shown in FIG. 6. In the storage medium 122 of this video game system 10 are stored the delays and volumes of echoes corresponding to three event places A, B and C.

First, the game is started by turning the start button 183a on and then turning the A-button 183b on. Simultaneously, the cheer data corresponding to the name of a specified label separately prepared for each event place is called by the background sound controller 201f (Step ST1). In this way, the background sound data read from the storage unit 122 and stored in the RAM 123 are read by the data reading unit 201c to output a cheer corresponding to the athletic field (event place), where the 100 M dash competition is held, via the loudspeaker 164. Subsequently, a label in a table 1 set in advance is called in the form of a sound reproduction function by the background sound controller 201f (Step ST3) and then the announcing sounds are reproduced (Step ST5). Specifically, the announcement data of the content "Ladies and Gentlemen! We will now begin Men's 100 Meter Dash" is read from the RAM 123 by the data reading unit 201c, and is fed to the sound output unit 16 to be outputted as announcing sounds via the loudspeaker 164. The announcement data includes a volume data and is outputted via the loudspeaker 164 in a specified volume based on the volume data.

Substantially simultaneously with the start of reproduction of the announcing sounds, the event place determining unit 201e determines whether the 100 M dash competition (event) is being held at the event place A (Step ST7). In this embodiment, this judgment is made based on the label name of the cheer data called in Step ST1.

If the judgment in Step ST7 is affirmative, the label is switched to a table 2 set in advance, and the delay setting unit 201i sets the delay corresponding to the event place A based on the delay data included in the game data. On the other hand, the data reading unit 201c reads the announcement data of the content "Ladies and Gentlemen! We will now begin Men's 100 Meter Dash" again from the RAM 123 after the set delay. Then, the volume setting unit 201j sets the volume corresponding to the event place A based on the volume data included in the game data, and announcing sounds (echoing sounds) having a low volume are so outputted via the loudspeaker 164 as to overlap the announcing sounds (direct sounds) previously outputted in the set volume (Step ST9). Thus, the announcing sounds outputted via the loudspeaker 164 include the previously outputted announcing sounds and echoes thereof having the delay and volume corresponding to the event place A.

If the judgment in Step ST7 is negative, the event place determining unit 201e determines whether the 100 M dash competition (event) is being held at the event place B (Step ST11). If the judgment in Step ST11 is affirmative, similar to the case of the event place A, the announcement data of the content "Ladies and Gentlemen! We will now begin Men's 100 Meter Dash" is read again from the RAM 123 after the delay set for the event place B, and is so outputted as announcing sounds as to overlap the previously outputted announcing sounds in the volume set for the event place B (Step ST13). Thus, the announcing sounds outputted via the loudspeaker 164 include the previously outputted announcing sounds and echoes thereof having the delay and volume corresponding to the event place B.

If the judgment in Step ST11 is negative, it is judged that the 100 M dash competition (event) is being held at the event place C and, similar to the cases of the event places A and B, the announcement data of the content "Ladies and Gentlemen! We will now begin Men's 100 Meter Dash" is read again from the RAM 123 after the delay set for the event place C, and is so outputted as announcing sounds as to overlap the previously outputted announcing sounds in the volume set for the event place C (Step ST15). Thus, the announcing sounds outputted via the loudspeaker 164 include the previously outputted announcing sounds and echoes thereof having the delay and volume corresponding to the event place C. Although three event places are set in this embodiment, four or more event places may be set. In such a case, the determining unit may be so provided as to cope with the number of the event places.

As described above, in the video game system of this embodiment in which a specific event is executed at the event place in the game space displayed on the television monitor 143, and the announcment data relating to this event are outputted via the loudspeaker 164, the event place where the specific event is being exeucted is determined, the announcement data relating to this event are outputted as announcing sounds and echoing corresponding to the type of the event place is applied to the announcing sounds.

Accordingly, the announcing sounds including echoes corresponding to the event places need not be individually stored for the respective event places in spite of capability to execute the video game full of feeling of presence. Thus, the contents of the program can be simplified, with the result that a memory capacity and a time required for the development of the program can be reduced to thereby effectively suppress an increase in production costs.

The present invention is not limited to the foregoing embodiment, and may take various embodiments described below.

(1) Although the type of the event place (outdoor athletic field, indoor gymnasium, etc.) where an event is excuted in the game space is determined based on the name of the label affixed to the cheer data in the foregoing embodiment, this judgement is not limited to the one based on the label name of the cheer data. This judgement may be made based on various data (event place determination data) which are data relating to the event places and can specify the event places such as the name of the title of the game and background sounds including firing sounds of pistols, whistling sounds, buzzing sounds and sounds of musical instruments.

(2) In the foregoing embodiment, the game program for executing the event and the one for outputting the background sounds are not particularly differentiated. However, the video game system may be constructed as follows. A main processor (main processing step) for performing a processing relating to execution of the event in accordance with a main program and a sound processor (or sound processing step) for performing a processing relating to the output of the background sounds are provided, wherein the sound processor (or sound processing step) is provided with the event place determining unit (or event place determining step) and a background sound controller (or background sound controlling step). When the background sound output command is issued in the main processor (or main processing step), the type of the event place is determined in the sound processor (or sound processing step) and echoing corresponding to the determined type of the event place is applied.

With such a construction, the main program and the sound program can be parallelly and individually developed since it is sufficient for the main processor only to issue the background sound output command. Thus, the programs can be devloped within a shorter period of time, enabling an increase in production costs to be more effectively suppressed. Further, since the delay in reading the background sound data and the volume of the background sounds which are set according to the type of the event place can be set only in the sound processor (or sound processing step) independently of the main processor (or main processing step), easy correction of bugs and easy change of designs can be realized. The main processor and the sound processor are both constructed by the memory unit 12 and the control unit 20, and the main program for executing the main processing and the sound program for excuting the sound processing are stored in specified data storage areas of the storage medium 122.

(3) Although echoes are created for the announcing sounds among various background sounds in the foregoing embodiment, they may be created for other background sounds such as cheers and sounds of musical instruments in substantially the same manner as in the case of the announcing sounds.

(4) In the foregoing embodiment, the echoes are created for the announcing sounds by repeatedly reading the same announcement data transferred from the storage medium 122 and stored in the RAM 123. However, the echoes may be created by storing two announcement data of the same content, successively reading the two announcement data after a dealy set for the event place, and outputting the announcing sounds by the later announcement data in a volume set for the event place.

(5) Although competition games such as fighting games, running completions, gymnastics are executed as video games in the foregoing embodiment, the present invention may be applied to training/growth game, music game and other video games. Accordingly, the events are not limited to competitions and the event places are not limited to athletic fields, gymnasiums, or like fields and studiums.

As described above, according to the present invention, while the event place where the event is executed is determined, the background sound data relating to the event is read and outputted as background sounds from the sound output unit and echoing corresponding to the type of the event place is applied to the background sounds.

Thus, the announcing sounds including echoes corresponding to the event places need not be individually stored for the respective event places in spite of capability to execute the video game full of feeling of presence. As a result, a memory capacity and a time required for the development of the program can be reduced to thereby effectively suppress an increase in production costs.

According to the present invention, the specific event may be executed by selecting one game program from a plurality of game programs enabling the event to be executed at different types of event places. Thus, independently of the selected game, the background sounds are enabled to include echoes corresponding to the event place. As a result, a video game having a better feeling of presence can be exeucted.

Further according to the present invention, the background sounds may be repeatedly outputted from the sound output unit after the delay set according to the type of the event place and the later background sounds may be outputted in lower volume than the previous background sounds. With this arrangement, the background sounds can include echoes corresponding to the event place regardless of which game is selected, enabling execution of a more interesting and ingenious video game.

Further according to the present invention, the same background sound data may be repeatedly read after the delay set according to the type of the event place, and the read background sound data may be outputted from the sound output unit as background sounds. This enables a reduction of a memory capacity for storing the background sound data while enabling the background sounds to include echoes corresponding to the event place regardless of which game is selected, enabling execution of a video game full of feeling of presence.

Further according to the present invention, among the background sounds outputted from the sound output unit, the later background sounds may be outputted in the lower volume set according to the type of the event place. Then, the backgound sounds can securely include echoes corresponding to the event place regardless of which game is selected, enabling execution of a video game having a further better feeling of presence.

Further according to the present invention, judgement may be made as to whether or not echoing needs to be applied to the background sounds to be outputted from the sound output unit. This enables only the background sounds which require echoing to securely include echoes, thereby preventing the background sounds which do not require echoing from erroneously including echoes.

Further according to the present invention, the background sounds which require echoing may be announcing sounds relating to the event. This enables execution of a video game full of feeling of presence.

Further according to the present invention, the main processor (main processing step) for performing the processing relating to execution of the event and the sound processor (or sound processing step) for performing the processing relating to the output of the background sounds may be provided, the sound processor (or sound processing step) may discrimate the type of the event place when the background sound output command is issued in the main processor (or main processing step) and echoing corresponding to the determined type of the event place may be applied. With this construction, the main program and the sound program can be parallelly and individually developed since it is sufficient for the main processor only to issue the background sound output command. Thus, the programs can be devloped within a shorter period of time.

This application is based on Japanese Patent Application Serial No. 2000-035577 filed on Feb. 14, 2000, the contents of which are hereby incorporated by reference.

Although the present invention has been fully described by way of examples with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A video game device comprising:
    a monitor;
    a display unit for displaying an event place where a specific event is performed on the monitor;
    a sound output unit for outputting a background sound relating to the event;
    a memory for storing a background sound data relating to the event;
    an event place determining unit for determining types of event places; and
    a background sound controller for reading our the background sound data from the memory, outputting it as a background sound and performing an echo process on the background sound in response to the type of the event place determined by the event place determining unit, the echo process producing echos of the background sound, said background sound controller including:
        a delay setting unit for setting a time delay of successive ones of said echos of the background sound by selecting a time delay associated with the event place; and
        a volume setting unit for setting volumes of said echos based on a damping factor associated with the event place such that successive ones of the echos of the background sound are outputted from the sound output unit in continuously lower volumes throughout the echo process.

2. A video game device according to claim 1, further comprising a game selection unit for selecting one game program from a plurality of game programs stored in the memory and the specific event is carried out when one game program is selected from the plurality of programs stored in the memory.

3. The video game device according to claim 1 wherein damping factors associated with event places located outdoors are set greater than damping factors associated with event places located indoors such that successive ones of the echos for an event place located outdoors are reduced more in volume than successive ones of the echos for an event place located indoors.

4. The video game device according to claim 3 wherein time delays associated with event places located outdoors are set greater than time delays associated with event places located indoors.

5. The video game device according to claim 4 wherein time delays and damping factors associated with event places located indoors are set based on sizes of the event places located indoors.

6. A video gang device according to claim 1, further comprising a main processor for performing a processing related to an execution of an event and a sound processor for performing a processing related to outputting a background sound, and the sound processor includes said event place determining unit and said background sound controller.

7. A background sound outputting method for a video game comprising the steps of:
- displaying on a monitor an event place;
- executing a specific event in the event place;
- outputting from a sound output unit a background sound relating to the event;
- determining a type of the event place;
- reading the background sound data stored in a memory;
- outputting the background sound data as a background sound; and
- performing an echo process on the background sound in response to said determined type of the event place and outputting echos of the background sound, including:
  - setting a time delay of successive ones of said echos of the background sound by selecting a time delay associated with the event place; and
  - setting volumes of said echos based on a damping factor associated with the event place such that successive ones of the echos of the background sound are outputted from the sound output unit in continuously lower volumes throughout the echo process.

8. A background sound outputting method according to claim 7, further comprising the step of selecting one game program from a plurality of game programs stored in the memory and the specific event is carried out when one game program is selected from the plurality of programs stored in the memory.

9. The method according to claim 7 wherein damping factors associated with event places located outdoors are set greater than damping factors associated with event places located indoors such that successive ones of the echos for an event place located outdoors are reduced more in volume than successive ones of the echos for an event place located indoors.

10. The method according to claim 9 wherein time delays associated with event places located outdoors are set greater than time delays associated with event places located indoors.

11. The method according to claim 10 wherein rime delays and damping factors associated with event places located indoors are set based on sizes of the event places located indoors.

12. A background sound outputting method according to claim 7, further comprising the steps of executing a main process for performing a processing related to an execution of an event and executing a sound process for performing a processing related to outputting the background sound, and when an order of outputting the background sound is issued by the main process, the sound process determines the type of event place and performs the echo process on the background sound in accordance with the type of the determined event place.

13. A computer-readable recording medium containing a background sound outputting program for a video game, the program comprising the steps of:
- displaying on a monitor an event place;
- executing a specific event in the event place;
- outputting from a sound output unit a background sound relating to the event;
- determining a type of the event place;
- reading the background sound data stored in a memory;
- outputting the background sound data as a background sound; and
- performing an echo process on the background sound in response to said determined type of the event place, and outputting echos of the background sound, including:
  - setting a time delay of successive ones of said echos of the background sound by selecting a time delay associated with the event place; and
  - setting volumes of said echos based on a damping factor associated with the event place such that successive ones of the echos of the background sound are outputted from the sound output unit in continuously lower volumes throughout the echo process.

14. A computer-readable recording medium according to claim 13, the program further comprising the step of selecting one game program from a plurality of game programs stored in the memory and the specific event is carried out when one game program is selected from the plurality of programs stored in the memory.

15. The computer-readable recording medium according to claim 13 wherein the program has damping factors associated with event places located outdoors set greater than damping factors associated with event places located indoors such that successive ones of the echos far an event place located outdoors are reduced more in volume than successive ones of the echos for an event place located indoors.

16. The computer-readable recording medium according to claim 15 wherein the program has time delays associated with event places located outdoors set greater than time delays associated with event places located indoors.

17. The computer-readable recording medium according to claim 13 wherein the program has time delays and damping factors associated with event places located indoors set based on sizes of the event places located indoors.

18. A computer-readable recording medium according to claim 13, the program further comprising the step of determining whether the echo process needs to be applied to the background sound outputted from the sound output unit.

19. A computer-readable recording medium according to claim 18, wherein the background sound which the echo process applies to is an announcing sound relating to the event.

20. A computer-readable recording medium according to claim 13, the program further comprising the steps of:
- a main process for performing a processing relating to execution of the event; and
- a sound process for performing a processing relating to the output of the background sound,
- wherein a type of the event place is determined and the echo process is applied on the background sound in response to the determined type of the event in the sound process step at a time when the background sound output command is issued in the main process step.

* * * * *